(12) United States Patent
Gigliotti

(10) Patent No.: US 9,267,832 B2
(45) Date of Patent: Feb. 23, 2016

(54) UTENSIL LIQUID DISPENSER DEVICE

(71) Applicant: John Gigliotti, New Hyde Park, NY (US)

(72) Inventor: John Gigliotti, New Hyde Park, NY (US)

(*) Notice: Subject to any disclaimer, the term of this patent is extended or adjusted under 35 U.S.C. 154(b) by 35 days.

(21) Appl. No.: 14/107,992

(22) Filed: Dec. 16, 2013

(65) Prior Publication Data

US 2014/0166698 A1 Jun. 19, 2014

Related U.S. Application Data

(60) Provisional application No. 61/738,171, filed on Dec. 17, 2012.

(51) Int. Cl.
*B67D 7/56* (2010.01)
*G01F 11/02* (2006.01)

(52) U.S. Cl.
CPC .................... *G01F 11/027* (2013.01)

(58) Field of Classification Search
USPC ................ 222/192, 158, 325–327, 386, 527, 222/566–570, 530; 401/265, 266, 261, 18, 401/25, 139
See application file for complete search history.

(56) References Cited

U.S. PATENT DOCUMENTS

| | | | | |
|---|---|---|---|---|
| 1,038,180 | A * | 9/1912 | Moreland | 401/179 |
| 1,685,731 | A * | 9/1928 | Trevena | 401/266 |
| 2,695,118 | A * | 11/1954 | Porter | 222/390 |
| 2,698,996 | A * | 1/1955 | Hickerson | 30/123 |
| RE26,937 | E * | 8/1970 | Sawyer | 401/266 |
| 5,346,380 | A * | 9/1994 | Ables | 425/87 |
| 5,377,879 | A * | 1/1995 | Isaacs | 222/205 |
| 6,675,482 | B1 | 1/2004 | Gilbert, Jr. et al. | |
| 8,038,037 | B2 | 10/2011 | deVirag et al. | |
| 2002/0148852 | A1 | 10/2002 | Schultz | |
| 2005/0000702 | A1* | 1/2005 | Shim | 169/51 |
| 2008/0124165 | A1* | 5/2008 | Rosner et al. | 401/263 |

* cited by examiner

*Primary Examiner* — Donnell Long

(57) ABSTRACT

A utensil liquid dispenser device may include a compressible reservoir that may include a top opening, a bottom opening and an interior housing. A plunger may be positioned within the interior housing of the compressible reservoir. A plunger rod may have a first end and a second end. The first end of the plunger rod may attach to the plunger. The second end of the plunger rod may extend out through the top opening of the compressible reservoir. A first end of a flexible hose may attach to the bottom opening of the compressible reservoir. At least one utensil fastener may be shaped around the compressible reservoir. In certain embodiments the utensil fastener may be attached to the compressible reservoir.

7 Claims, 5 Drawing Sheets

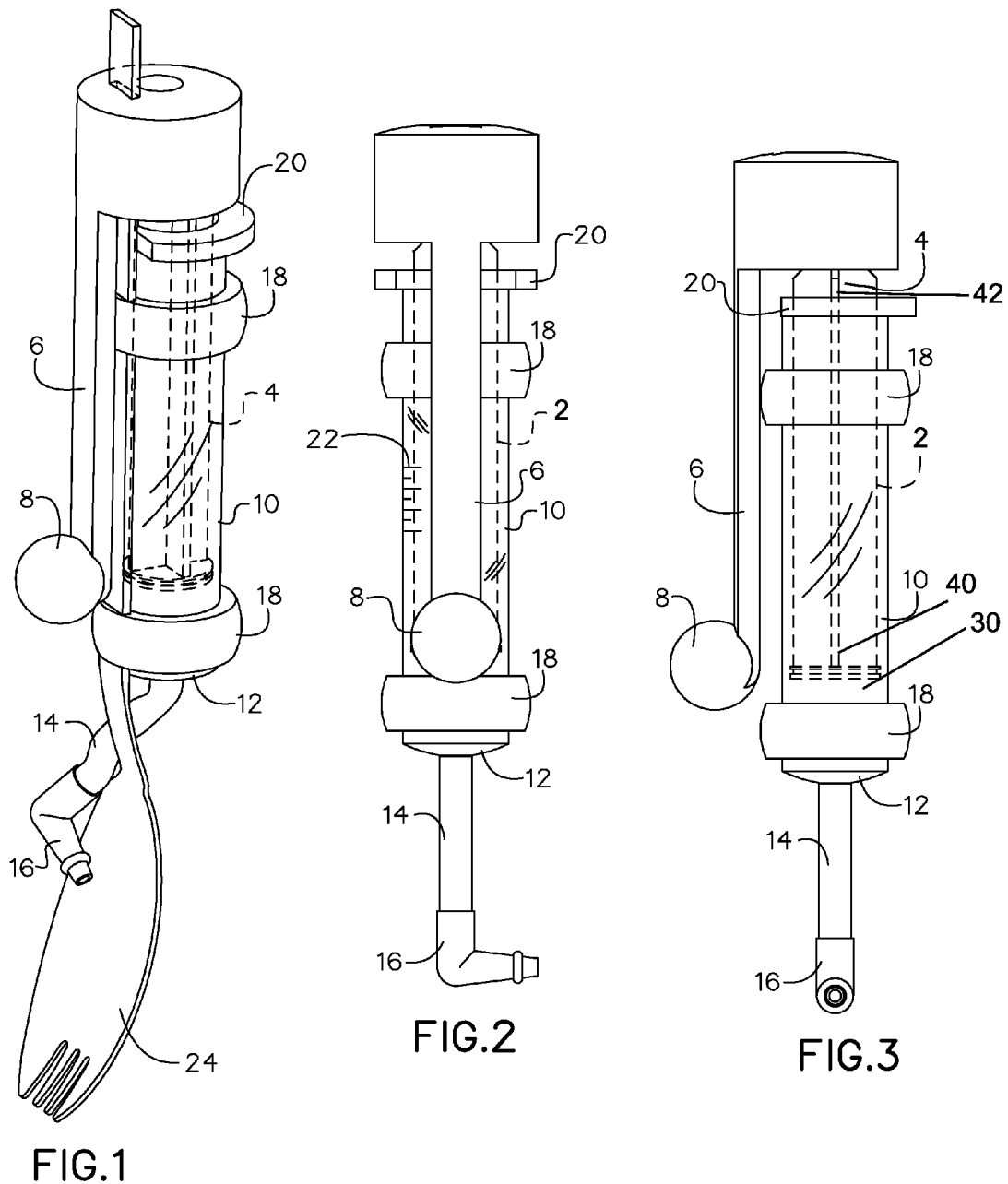

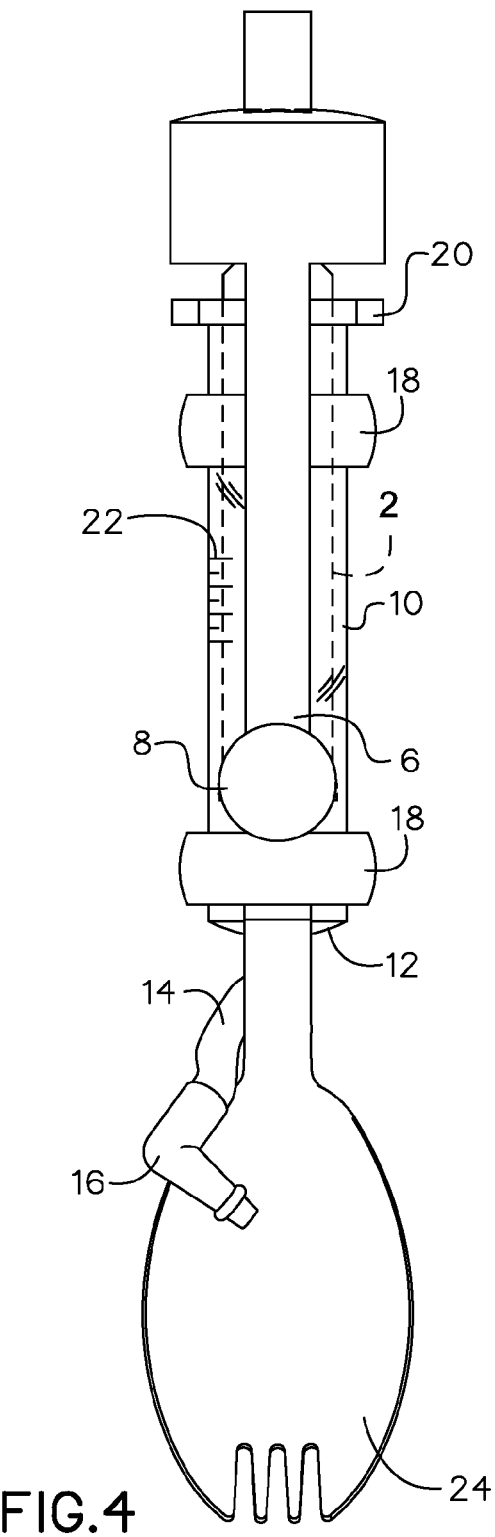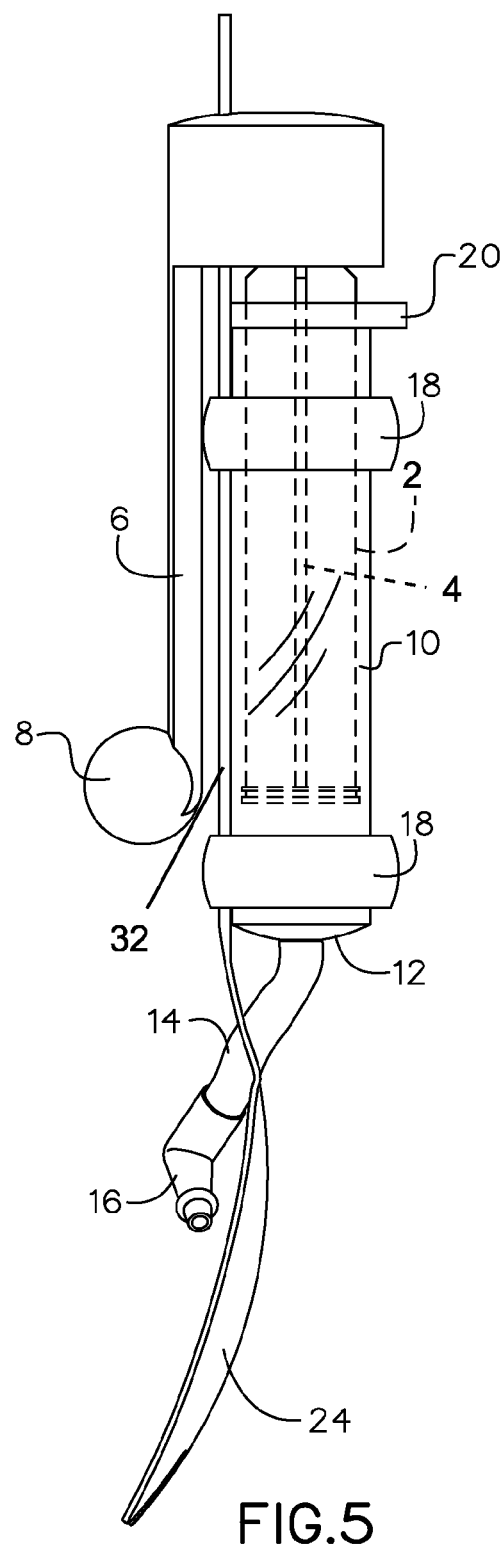

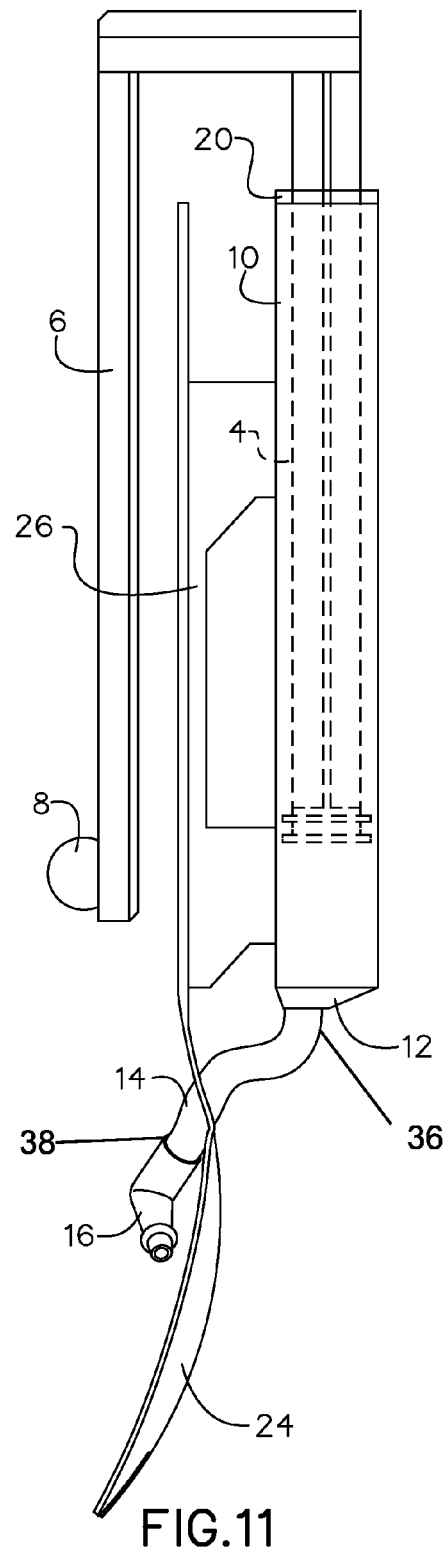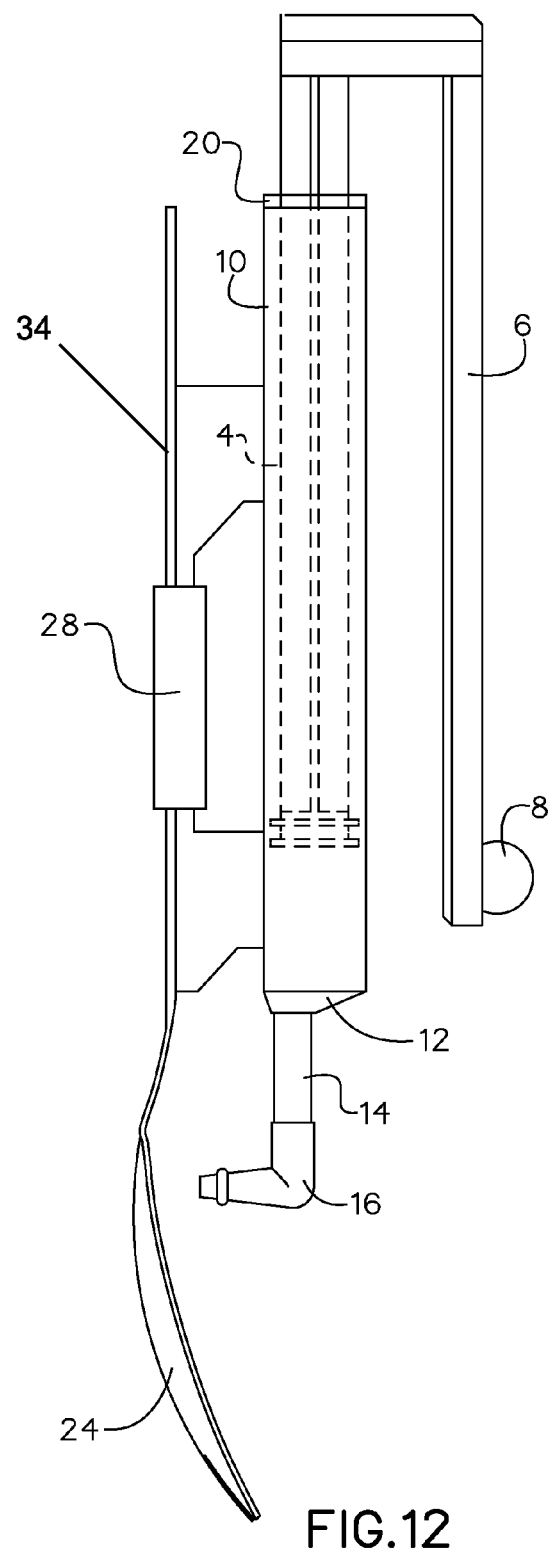

UTENSIL LIQUID DISPENSER DEVICE

CROSS-REFERENCE TO RELATED APPLICATION

This application claims the benefit of U.S. provisional application No. 61/738,171, filed Dec. 17, 2012, the contents of which are herein incorporated by reference.

BACKGROUND OF THE INVENTION

The present invention relates to utensils and, more particularly, to a utensil liquid dispenser device.

Currently, it is inconvenient counting condiment calories and difficult to have any control of the condiment amount applied to each bite. There are no devices designed to attach to a common eating utensil that are intended to directly apply condiments. It is inconvenient applying controlled amounts of liquid toward one end of an eating or cooking or serving utensil with one hand while using a utensil with the other hand. It is also difficult to do so with the utensil and liquid applicator in the same hand.

As can be seen, there is a need for a utensil liquid dispenser device allowing an individual to accurately count calories and control condiment intake and application.

SUMMARY OF THE INVENTION

In one aspect of the present invention, a utensil liquid dispenser device comprises: a compressible reservoir comprising a top opening, a bottom opening and an interior housing; a plunger positioned within the interior housing of the compressible reservoir; a plunger rod having a first end and a second end, wherein the first end of the plunger rod attaches to the plunger, wherein the second end of the plunger rod extends out through the top opening of the compressible reservoir; a flexible hose having a first end and a second end, wherein the first end of the flexible hose attaches to the bottom opening of the compressible reservoir; and at least one utensil fastener shaped around the compressible reservoir.

In another aspect of the present invention, a method for applying a liquid to a utensil comprises: determining a suitable eating utensil and a preferable liquid to be used with a utensil liquid dispenser, wherein the utensil liquid dispenser comprises a compressible reservoir comprising a top opening, a bottom opening and an interior housing; a plunger positioned within the interior housing of the compressible reservoir; a plunger rod having a first end and a second end, wherein the first end of the plunger rod attaches to the plunger, wherein the second end of the plunger rod extends out through the top opening of the compressible reservoir; a flexible hose having a first end and a second end, wherein the first end of the flexible hose attaches to the bottom opening of the compressible reservoir; at least one utensil fastener shaped around the compressible reservoir; and an angled nozzle attached to the second end of the flexible hose; submerging the angled nozzle into the liquid; pulling on the plunger rod, filling the compressible reservoir with the liquid; positioning the utensil between the utensil fasteners and the compressible reservoir, temporarily fastening the utensil alongside the compressible reservoir; positioning the angled nozzle around a feeding end of the utensil; and applying downward pressure to the pressure lever, expelling the liquid out of the angled nozzle.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention in use;

FIG. 2 is a front view of an exemplary embodiment of the present invention;

FIG. 3 is a side view of an exemplary embodiment of the present invention;

FIG. 4 is a front view of an exemplary embodiment of the present invention in use;

FIG. 5 is a side view of an exemplary embodiment of the present invention in use;

FIG. 11 is a side view of an alternate embodiment of the present invention; and

FIG. 12 is a side view of an alternate embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a utensil liquid dispenser device that may include a compressible reservoir that may include a top opening, a bottom opening and an interior housing. A plunger may be positioned within the interior housing of the compressible reservoir. A plunger rod may have a first end and a second end. The first end of the plunger rod may attach to the plunger. The second end of the plunger rod may extend out through the top opening of the compressible reservoir. A first end of a flexible hose may attach to the bottom opening of the compressible reservoir. At least one utensil fastener may be shaped around the compressible reservoir. In certain embodiments the utensil fastener may be attached to the compressible reservoir.

Figure 6:
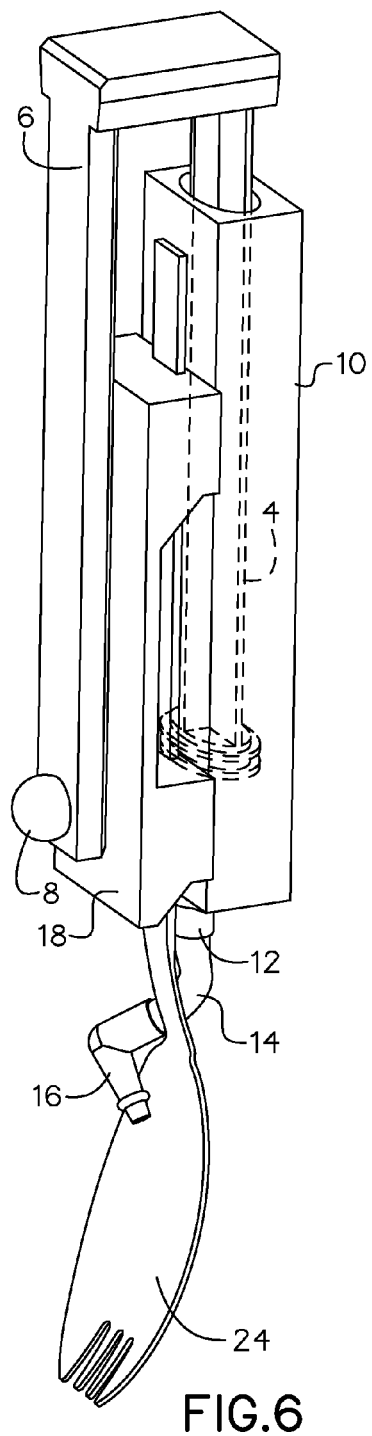
FIG. 6 is a perspective view of an alternate embodiment of the present invention in use.
Figure 7:
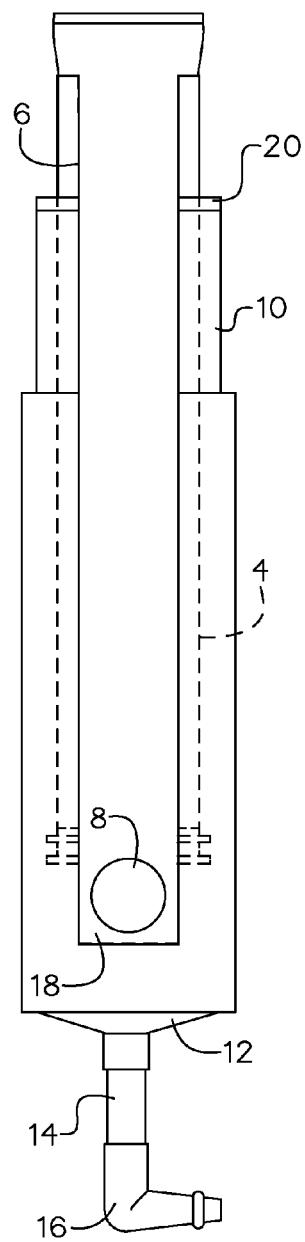
FIG. 7 is a front view of an alternate embodiment of the present invention.
Figure 8:
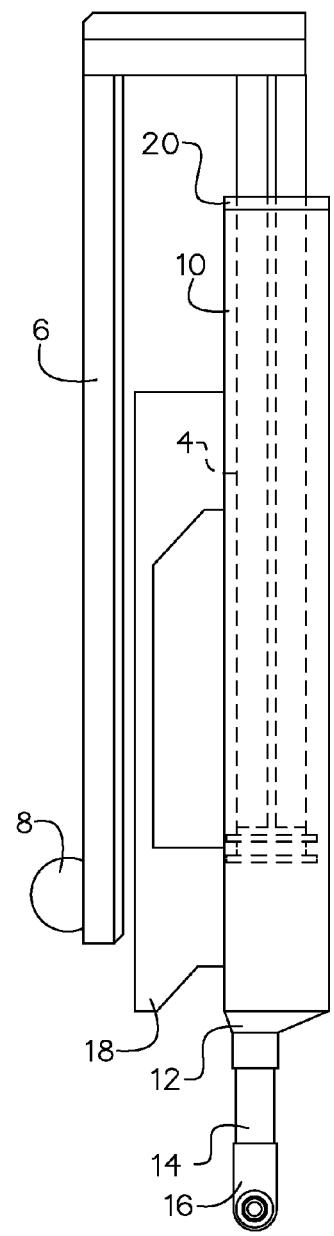
FIG. 8 is a side view of an alternate embodiment of the present invention.
Figure 9:
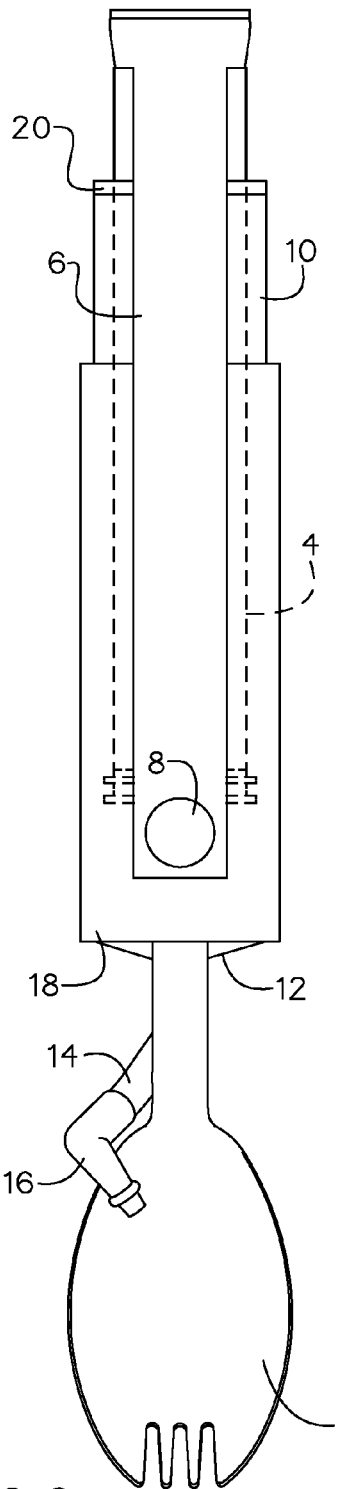
FIG. 9 is a front view of an alternate embodiment of the present invention in use.
Figure 10:
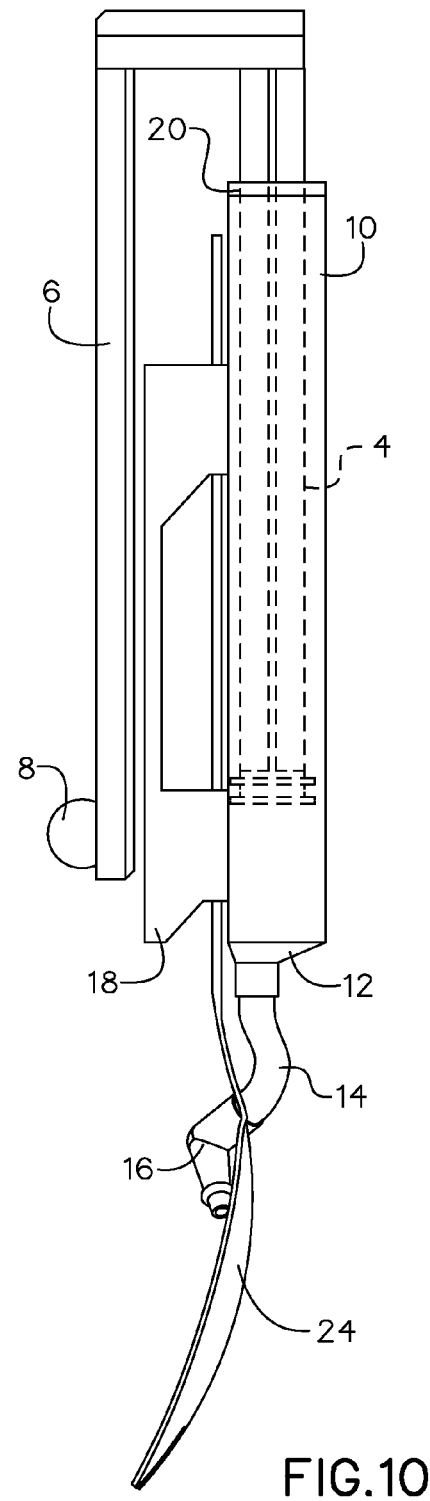
FIG. 10 is a side view of an alternate embodiment of the present invention in use.

As is illustrated in FIGS. 1 through 12, the present invention may include a compressible reservoir 10. In certain embodiments, the compressible reservoir 10 may be a cylinder. The compressible reservoir 10 may have a top opening 20 and a bottom opening 12 and have an interior housing 30. A plunger 2 may be within the interior housing 30 of the compressible reservoir 10. The plunger 2 may be attached to a plunger rod 4. The plunger rod 4 may extend out through the top opening 20 of the compressible reservoir 10. A flexible hose 14 may be attached to the bottom opening 12 of the compressible reservoir 10. At least one utensil fastener 18 may be shaped to be around an exterior of the compressible reservoir 10 towards the bottom opening 12. Spacing 32 may be provided so that a handle 34 of a utensil 24 may fit through the spacing 32 and be temporarily secured alongside the compressible reservoir 10. In certain embodiments, the at least one utensil fastener 18 may attach the utensil to the utensil liquid dispenser device magnetically, with a strap or the like.

In certain embodiments, the compressible reservoir 10 may have the top opening 20 diameter that may be larger than the bottom opening 12 diameter. In certain embodiments, the compressible reservoir 10 may have a length of approximately 7 cm to 11 cm and a diameter of approximately 1 cm and approximately 3 cm. The compressible reservoir 10 may be a liquid reservoir. In certain embodiments, the compressible reservoir 10 may have graduations 22 along the side of the compressible reservoir 10 exterior in order to measure the liquid contents of the compressible reservoir 10. The graduations 22 may be etched, printed or the like along the exterior of the compressible reservoir 10. The compressible reservoir 10 may be made from a material such as plastic or the like.

In certain embodiments, the top opening 20 may allow the plunger 2 to be placed to fill the interior housing 30 of the compressible reservoir 10. The top opening 20 may also allow an opening for the plunger rod 4 to function with the plunger 2. The plunger rod 4 may have a first end 40 and a second end 42. The first end 40 of the plunger rod 4 may attach to the plunger 2. The second end 42 of the plunger rod 4 may extend out from the top opening 20 of the compressible reservoir 10. The bottom opening 12 may allow liquid to exit the compressible reservoir 10. The diameter of the plunger rod 4 may be smaller in relation to the plunger 2, the top opening 20 and the compressible reservoir 10.

In certain embodiments, the flexible hose 14 may be between approximately 1.5 cm and approximately 5 cm in length. In certain embodiments, the flexible hose 14 may be between approximately 3 mm and approximately 8 mm in diameter. The flexible hose 14 may be constructed from a flexible water resistant material such as, but not limited to, rubber and the like. The flexible hose 14 may have a first end 36 and a second end 38. The first end 36 of the flexible hose may be connected to the bottom opening 12 and may allow liquid to pass from the bottom opening 12 to the utensil 24. In certain embodiments, an angled nozzle 16 may be attached to the second end 38 of the flexible hose 14 so that the liquid may pass from the bottom opening 12 to the angled nozzle 16 through the flexible hose 14. The angled nozzle 16 may allow for the user to direct the liquid to a preferred location. In certain embodiments, the angled nozzle 16 may be positioned on top of the feeding end of the utensil 24 or positioned under the utensil 24 if desired.

In certain embodiments, the at least one utensil fastener 18 may be made from a plastic, rubber, metal, elastic material or the like. The utensil fastener 18 may be shaped around the exterior of the compressible reservoir 10. At least one utensil fastener 18 may be located near the bottom opening 12 of the compressible reservoir 10. Spacing 32 may be provided so that the handle 34 of the utensil 24 may fit through the spacing 32 and be temporarily secured alongside the compressible reservoir 10.

In certain embodiments, a pressure lever 6 may be attached to the second end 42 of the plunger rod 4 that may protrude outwardly through the top opening 20. The pressure lever 6 may extend from the second end 42 of the plunger rod 4 to alongside the handle 34 of the utensil 24 that may be secured alongside the compressible reservoir 10 when the device is in use. The pressure lever 6 may apply pressure to the plunger rod 4 in assisting in expelling liquid from the compressible reservoir 10. The pressure lever 6 may have an opening between where it may be attached to the plunger rod 4 to allow the utensil 24 being used with the device to protrude through to accommodate the various lengths of utensils 24 that may be used in conjunction with the device. The pressure lever 6 may also be shaped so that the section that connects to the plunger rod 4 may not be in the way of the movement of the utensil 24 when the device may be in use. In certain embodiments, the pressure lever 6 may be between approximately 8 cm and approximately 14 cm and a relatively similar length as the plunger rod 4.

In certain embodiments, a thumb grip 8 may be attached to the pressure lever 6. The thumb grip 8 may be made out of a material that may have grip-like attributes such as, but not limited to, plastic, rubber or the like. The thumb grip 8 may allow a user to more easily manipulate the pressure lever 6.

In alternate embodiments, the at least one fastener may be a magnetic holder 26 that may hold the utensil 24 to the device. In certain embodiments, the at least one fastener may be a strap 28 that may be attached to the utensil 24 to temporarily secure it to the device.

In certain embodiments, in order to fill the compressible reservoir 10 with a desired amount of liquid, the compressible reservoir 10 may be completely compressed and expelled of its contents with the plunger 2. The angled nozzle 16 may be submerged in the liquid and the plunger 2 may be pulled back to the desired amount of liquid position noted on the compressible reservoir 10 by the graduations 22, pulling the liquid into the compressible reservoir 10. In certain embodiments, the utensil liquid dispenser device may be used while serving salad or other items.

A method of using the utensil liquid dispenser device may include the following. The person may determine a suitable eating, cooking or serving utensil 24 and a preferable liquid to be used with the utensil liquid dispenser device. The person may then submerge the angled nozzle 16 into the liquid and pull on the plunger rod 4, which may fill the compressible reservoir 10 with the liquid. The person may position the utensil 24 between the utensil fasteners 18 and the compressible reservoir 10, temporarily fastening the utensil 24 alongside the compressible reservoir 10. The angled nozzle 16 may then remain positioned behind the feeding end of the utensil 24 or positioned on top of the eating, cooking or serving end of the utensil 24, depending on the person's discretion. With the utensil liquid dispenser device and utensil 24 in hand, the person may apply downward pressure to the pressure lever 6, expelling the liquid out of the angled nozzle 16. The downward pressure may be accomplished by the person's thumb or the like. In certain embodiments, a person may press down on the thumb grip 8 in order to apply pressure for releasing the liquid.

It should be understood, of course, that the foregoing relates to exemplary embodiments of the invention and that modifications may be made without departing from the spirit and scope of the invention as set forth in the following claims.

What is claimed is:

1. A utensil liquid dispenser device comprising:
 a compressible reservoir comprising a top opening, a bottom opening and an interior housing;
 a plunger positioned within the interior housing of the compressible reservoir;
 a plunger rod having a first end and a second end, wherein the first end of the plunger rod attaches to the plunger, wherein the second end of the plunger rod extends out through the top opening of the compressible reservoir;
 a pressure lever having a first end and a second end, wherein the second end of the plunger rod is attached to or is integrally joined with the second end of the pressure lever;
 a flexible hose having a first end and a second end, wherein the first end of the flexible hose attaches to the bottom opening of the compressible reservoir; and
 at least one utensil fastener shaped around the compressible reservoir;

wherein the pressure lever extends away from the second end of the plunger rod towards the bottom opening of the compressible reservoir for a longitudinal extent that is approximately equal to a longitudinal extent of the plunger rod between the plunger rod first and second ends;

wherein the pressure lever is arranged substantially in parallel to the pressure rod;

wherein a thumb grip is positioned on the pressure lever proximate the first end thereof; and wherein applying a force to move the grip in a direction towards or away from the bottom opening of the compressible reservoir causes both the pressure lever and the plunger rod and therefore the plunger to move in a same direction.

2. The utensil liquid dispenser device of claim 1, wherein the at least one utensil fastener is attached to the compressible reservoir.

3. The utensil liquid dispenser device of claim 1, wherein at least one utensil fastener is positioned on the bottom opening end of the compressible reservoir.

4. The utensil liquid dispenser device of claim 1, wherein the at least one fastener comprises a magnetic holder.

5. The utensil liquid dispenser device of claim 1, wherein the at least one fastener comprises a strap.

6. The utensil liquid dispenser device of claim 1, further comprising an angled nozzle attached to the second end of the flexible hose.

7. The utensil liquid dispenser device of claim 1, further comprising graduations along the exterior of the compressible reservoir.

* * * * *